US011061177B2

(12) United States Patent
Tissot

(10) Patent No.: US 11,061,177 B2
(45) Date of Patent: Jul. 13, 2021

(54) OPTICAL FIBER LIGHT SOURCE WITH COMPOSITE OVERCOATING STRUCTURE

(71) Applicant: L.E.S.S. LTD, Renens (CH)

(72) Inventor: Yann Tissot, Lausanne (CH)

(73) Assignee: L.E.S.S. LTD., Renens (CH)

( * ) Notice: Subject to any disclaimer, the term of this patent is extended or adjusted under 35 U.S.C. 154(b) by 62 days.

(21) Appl. No.: 16/063,146

(22) PCT Filed: Dec. 16, 2016

(86) PCT No.: PCT/IB2016/057738
§ 371 (c)(1),
(2) Date: Jun. 15, 2018

(87) PCT Pub. No.: WO2017/103889
PCT Pub. Date: Jun. 22, 2017

(65) Prior Publication Data
US 2019/0004230 A1    Jan. 3, 2019

Related U.S. Application Data

(60) Provisional application No. 62/268,815, filed on Dec. 17, 2015.

(51) Int. Cl.
*F21V 8/00*    (2006.01)
*F21V 5/00*    (2018.01)
(Continued)

(52) U.S. Cl.
CPC ............ *G02B 6/0003* (2013.01); *F21V 5/004* (2013.01); *F21V 5/02* (2013.01); *F21V 7/06* (2013.01); *G02B 6/001* (2013.01)

(58) Field of Classification Search
None
See application file for complete search history.

(56) References Cited

U.S. PATENT DOCUMENTS 4,591,245 A * 5/1986 Schreiter ................ G02B 23/06
                                                        359/365
5,905,837 A * 5/1999 Wang ................... G02B 6/2817
                                                        385/123
(Continued)

FOREIGN PATENT DOCUMENTS

CN    103635839    3/2014
JP    H07-1426 U    1/1995
(Continued)

OTHER PUBLICATIONS

Second Office Action of the China National Intellectual Property Administration dated Apr. 24, 2020 for related Chinese Patent Application No. 201680074198.5.
(Continued)

*Primary Examiner* — Laura K Tso
(74) *Attorney, Agent, or Firm* — Womble Bond Dickinson (US) LLP

(57) ABSTRACT

A solid body made of an inactive, light transmissive material (3) has embedded therein an optical fiber (6) having a lengthwise segment (9) in which a scattering structure is formed that is to redirect primary propagating light sideways out of the fiber (6). An active photoluminescent layer integrated in the optical fiber (6) is to wavelength-convert the primary light into secondary light. The solid body is generally cylindrical but without rotational symmetry about the center longitudinal axis (2) of the fiber (6). A portion of the outer side surface of the body is curved and is covered by an external reflector (4), while another portion of the outer side surface is uncovered by the reflector in order for the secondary light to emerge. Other embodiments are also described and claimed.

28 Claims, 5 Drawing Sheets

(51) Int. Cl.
*F21V 5/02* (2006.01)
*F21V 7/06* (2006.01)

(56) References Cited

U.S. PATENT DOCUMENTS

| | | | | |
|---|---|---|---|---|
| 5,937,127 | A * | 8/1999 | Zarian | B29D 11/00663 |
| | | | | 385/128 |
| 7,260,297 | B2 * | 8/2007 | Hajto | G02B 1/046 |
| | | | | 385/115 |
| 8,750,671 | B1 * | 6/2014 | Kelly | F21V 3/049 |
| | | | | 362/335 |
| 2005/0111813 | A1 * | 5/2005 | Hajto | G02B 1/046 |
| | | | | 385/141 |
| 2010/0066254 | A1 | 3/2010 | Ott et al. | |
| 2014/0226353 | A1 | 8/2014 | Sohizad et al. | |

FOREIGN PATENT DOCUMENTS

| | | |
|---|---|---|
| JP | 2000-292786 A | 10/2000 |
| JP | 2001-521200 A | 11/2001 |
| JP | 2003-115209 A | 4/2003 |
| JP | 2003-281910 A | 10/2003 |
| JP | 2011-040263 A | 2/2011 |
| JP | 2011-112794 A | 6/2011 |
| JP | 2010-514108 A | 1/2013 |
| JP | 2014515871 A | 7/2014 |
| JP | 2015-181808 A | 10/2015 |
| WO | WO 2006/051475 A1 * 5/2006 ............... G02B 6/00 |
| WO | WO-2012146960 | 11/2012 |
| WO | WO-2013055842 | 4/2013 |
| WO | WO-2013140484 | 9/2013 |
| WO | WO-2013191690 | 12/2013 |

OTHER PUBLICATIONS

Chinese Office Action dated Sep. 29, 2019 with English translation, Chinese Application No. 201680074198.5.
L.E.S.S. Ltd, "Written Opinion and International Search Report," PCT Application No. PCT/IB2016/057738 (dated Mar. 31, 2017).
IB of WIPO—Notification Concerning Transmittal of International Preliminary Report on Patentability dated Jun. 28, 2018 for related International Application No. PCT/IB2016/057738 (10 pgs.).
Notice of Reason for Refusal, dated Aug. 11, 2020, issued by the Japanese Patent office for related patent application No. 2019-161786.

* cited by examiner

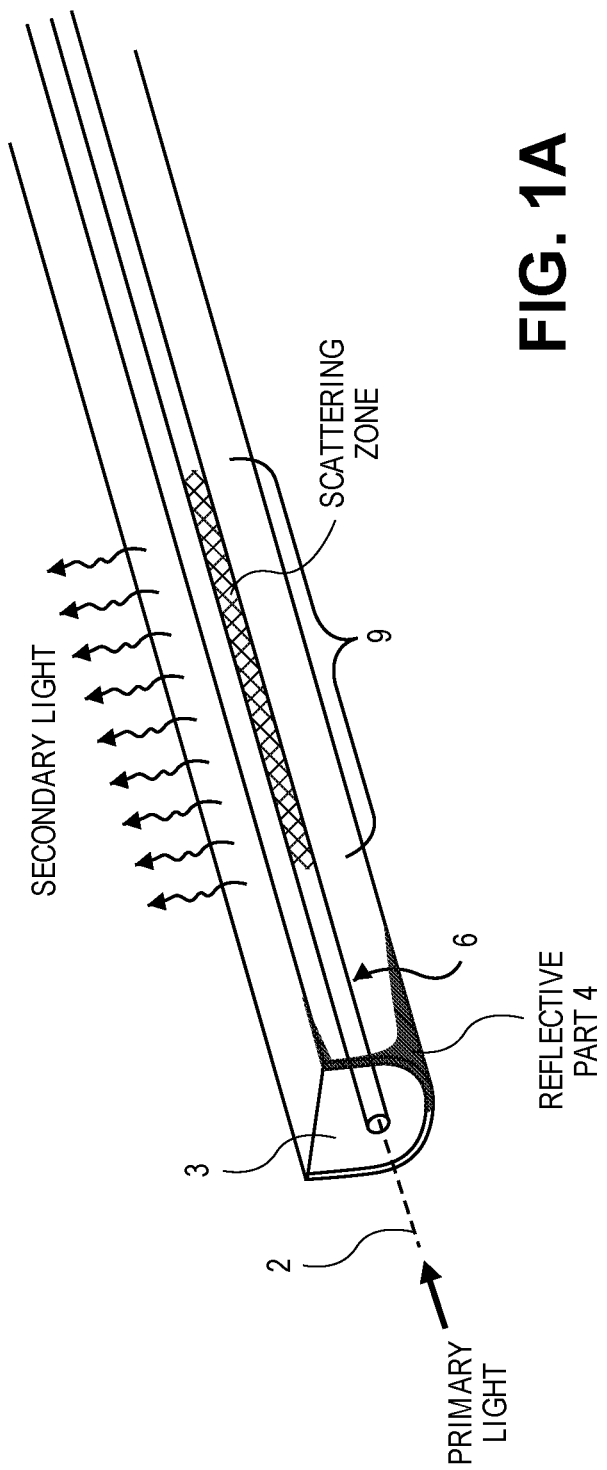

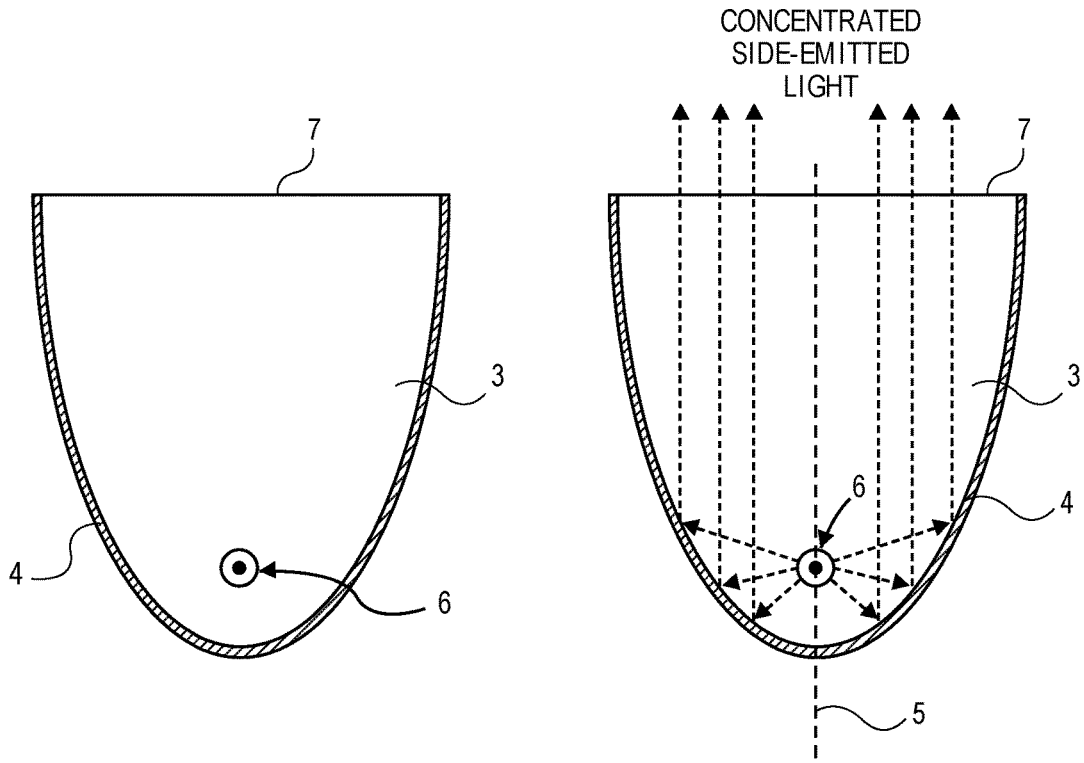
FIG. 1B
FIG. 1C
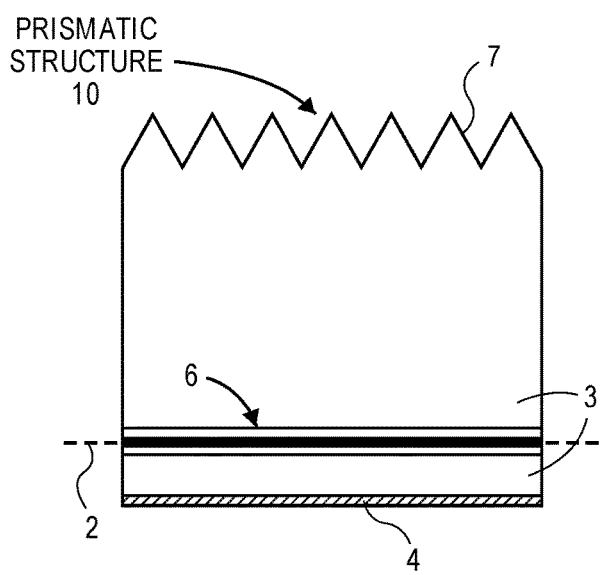
FIG. 2A
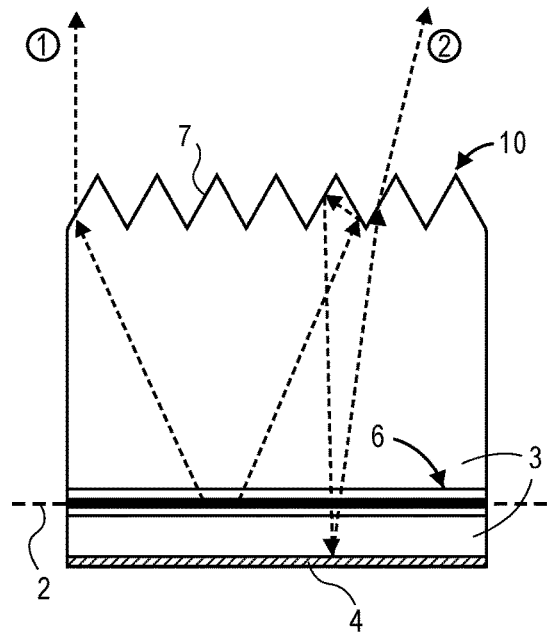
① DIRECT REDIRECTION FROM PRISMATIC STRUCTURE
② INDIRECT REDIRECTION FROM THE COMPOSITE OVERCOATING
FIG. 2B

OPTICAL FIBER LIGHT SOURCE WITH COMPOSITE OVERCOATING STRUCTURE

This patent application claims the benefit of the earlier filing date of U.S. Provisional Application Ser. No. 62/268,815 filed Dec. 17, 2015.

FIELD

An embodiment of the invention relates to a light source that has an optical fiber based side-emitter embedded in a composite overcoating structure, where the latter is designed to modify the illumination scheme of the optical fiber side-emitted light, and ease integration of the light source into a system. Other embodiments are also described.

BACKGROUND

An optical fiber is known to bring an optical signal from one fiber end to another fiber end without significant losses. In other cases, the fiber is designed to leak the optical signal in a direction substantially transverse to the propagation direction of the optical signal. This effect is typically the result of the interaction of light (the optical signal) with integrated scattering regions (e.g. holes) in the fiber. The scattering regions may be realized by adding elements while drawing the fiber, or they may be realized through mechanical, laser or chemical post-processing of the fiber.

In other cases, luminescent materials are integrated inside the fiber-core material, inside the cladding, or inside a coating of the fiber, to partially or completely convert the primary or propagating light into secondary light that has lower or higher wavelength than the primary light.

SUMMARY

An embodiment of the invention is an optical fiber side-emitting light source that has a side-emitting optical fiber as the light emitter, having a fiber core through which primary light propagates, e.g., in accordance with total internal reflection off a fiber cladding of the optical fiber. A lengthwise segment, of a whole length of the fiber, contains a scattering region, which serves to redirect the propagating primary light (that is, propagating in the fiber until it enters the segment) sideways out of the fiber. An active, photoluminescent material may also been integrated with the fiber, e.g., as a layer or coating on an outer side surface of the cladding of the fiber, to be stimulated by the redirected primary light and produce wavelength converted secondary light. In one embodiment, the secondary light is combined with some of the redirected primary light that has been unabsorbed by the photoluminescent material, resulting in a broader spectrum light, e.g., white light, emerging sideways from the fiber. Such a combination of the primary light and secondary light is not limited to the generation of white light however; the photoluminescent material and the primary light wavelength can be designed to alternatively yield side-emitted light of another color, e.g. blue, green, yellow, orange, or red.

The side-emitting fiber, including at least its lengthwise segment, which is the actual light emitter, is also integrated with a composite overcoating structure having a designed shape (also referred to here as a shaped overcoating structure). The term "composite" is used here to describe a structure that is made of at least two dissimilar materials, dissimilar in terms of physical or chemical properties, that are joined together such that the characteristics of the resulting combination structure is different from those of its individual constituent parts. For instance, the composite structure can be made of a combination of one or more inactive, light transmissive parts or layers, and a reflective part or layer.

The composite overcoating structure may be designed to: be asymmetrically shaped such that it reflects the side-emitted light from the fiber in a preferred "asymmetric" manner, e.g. directional or having a preferred transverse direction, not omnidirectional, such as the redirected light emerging from the overcoating structure through only a portion of the entire circumference of the structure (referred to here as the top surface or top layer); be asymmetrically shaped or keyed on its outside bottom surface in order to ease its assembly into a system (e.g. by inserting it longitudinally); be made of dissimilar materials that are chosen such that it is selectively opaque, transparent or semi-transparent in an asymmetric way to the side-emitted light emerging from the fiber; be made of dissimilar materials that are chosen such that it is less flexible than the fiber thereby forming an exoskeleton; be made of dissimilar materials that are chosen such that it is impermeable or hermetic to the external environment (e.g. waterproof or gas proof); be made of dissimilar materials that comprise additional inserts in order to ease its assembly into a system; exhibit an outer or inner surface that is mechanically structured such that it redirects the side-emitted light from the fiber in a preferred direction, e.g., a prismatic structure having elongated prism cells that are oriented side by side, not end to end, forming a sequence of cells in the direction of the longitudinal axis of the optical fiber (the longitudinal direction.)

A method for manufacturing the inactive, light transmissive portion of the shaped overcoating structure includes a succession of an extrusion process where the fiber has been previously formed and is fed through a nozzle while being covered by the inactive light transmissive material in fluid form, that gives a preliminary shape to the light transmissive portion (once the light transmissive material has solidified after extrusion), followed with a selective photo- or thermal polymerization process or a mechanical abrasion process to achieve precision in the shaping of the bottom surface of the extruded light transmissive portion. Another method for manufacturing the shaped, overcoating structure may be the succession of an overmolding process, where the fiber is positioned inside a mold that exhibits the counter or complementary shape of the final or desired light transmissive portion, combined with a selective photo- or thermal polymerization process to achieve precision in the shaping of the bottom surface of the light transmissive portion. In either case, the formation of the light transmissive part may be followed with a method for manufacturing the reflective part, on the bottom surface of the light transmissive part, by depositing, sputtering, dipping or evaporating a reflective material such as aluminum onto the bottom surface of the light transmissive part. In another embodiment, instead of a reflective layer, a diffusive layer may be formed on the bottom surface; this may be done by depositing, sputtering or evaporating a mixture of diffusing particles onto the bottom surface, or dipping the light transmissive portion into a mixture of diffusing particles.

The summary given above does not include an exhaustive list of all aspects of the invention. It is contemplated that the invention may encompass all systems and methods that can be practiced from all suitable combinations of the various aspects summarized above, as well as those disclosed in the Detailed Description below and particularly pointed out in the Claims, and in the associated Drawings. Such combinations may have particular advantages that are not recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIG. 1a is a perspective view of an example of a light source having a composite overcoating structure.

FIG. 1b shows a parabolic, composite overcoating structure, in a section view in a transverse plane.

FIG. 1c is illustrating the side-emitted light emerging from the embedded fiber and redirected by the composite structure of FIG. 1c.

FIG. 2a shows a section view in a longitudinal plane of a composite overcoating structure having a prismatic lens top layer.

FIG. 2b illustrates some of the light redirection and recycling functions of the composite structure of FIG. 2a.

FIG. 2c shows a section view in a transverse plane of the composite structure of FIG. 2a.

FIG. 3b shows a section view in a longitudinal plane of the composite overcoating structure of FIG. 3a.

FIG. 4b shows a section view in a longitudinal plane of the composite overcoating structure of FIG. 4a.

DETAILED DESCRIPTION

Figure 2C:
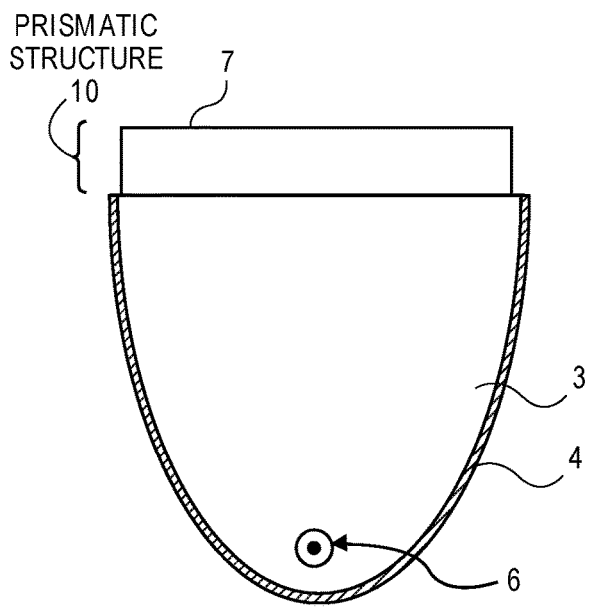

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known structures, and techniques have not been shown in detail so as not to obscure the understanding of this description.

In this disclosure an optical fiber side-emitting light source is described whose overcoating structure is made of dissimilar materials that are designed and shaped in order to support the redirection and re-shaping of the light emerging from the side of an optical fiber that is embedded in the overcoating structure. The light source may be used as part of any illumination system.

In accordance with an embodiment of the invention and referring now to FIG. 1a, a fiber-based side-emitting light source has an optical fiber 6 that may have a core and a cladding. Primary propagating light is produced by a light emitter such as a laser or a light emitting diode (LED) that is coupled to the fiber (not shown.) The primary light propagates along a center longitudinal axis 2 of the fiber 6, in a downstream direction as shown, until it is scattered out of the fiber through a side of the fiber 6, by a scattering zone (e.g., formed in a core of the fiber 6.) The scattered radiation or out-coupled light takes place in a direction substantially transverse to the longitudinal axis 2 of the fiber 6, either in a directional manner (forming a cone or lobe of light having a radial span of under 360°) or in an isotropic or omnidirectional manner (radiating at equal strength all around the fiber). Examples of scattering zones that can yield such a result can be found in international patent application no. PCT/IB2012/000617 □ (WAVEGUIDE APPARATUS FOR ILLUMINATION SYSTEMS) filed 28 Mar. 2012. Other types of side-emitting optical fibers can alternatively be used. The fiber 6 may also have formed on it a layer of photoluminescent material to perform wavelength conversion upon the primary propagating light, to result in a side-emitted light that includes secondary light having a different wavelength than the primary light. The resulting side-emitted light may exhibit a broader spectrum as compared to the primary light, e.g. white light resulting from the combination of unabsorbed primary light and the secondary light. Alternatively, the photoluminescent material and the wavelength of the primary light may be selected such that very little primary light is left unabsorbed, resulting in the side-emitted light emerging from the fiber 6 being dominated by the secondary light, e.g. red or infrared.

Still referring to FIG. 1a, there is a light transmissive part 3 that conforms to the side surface of the fiber 6, and a reflective part 4 (also referred to as a reflective backing), both forming a single, composite overcoating structure (where the fiber 6 is "embedded" within the light transmissive part 3 of the composite overcoating structure.) The light transmissive part 3 may be made of a single, light transmissive, inactive (i.e., not photoluminescent, or not wavelength converting) material, e.g., polycarbonate, and may completely surround the side surface of the fiber 6 and may leave no air gaps between the fiber and the reflective part 4, the latter conforming to the bottom surface of the light transmissive part 3 (as shown.) All of the light transmissive part 3 may be made of the same material, or it may be composed of layers of different materials.

The overcoating structure of FIG. 1a may alternatively be viewed as having a solid body (e.g., the light transmissive part 3) that is made of an inactive, light transmissive material and is generally cylindrical (having a side surface that extends from a near end or face to a far end or face) but without rotational symmetry about an internal, longitudinal axis or spine of the body (e.g., the center longitudinal axis 2. An external reflector (e.g., the reflective part 4) has a curved, light reflective surface that conforms to and abuts a portion of the side surface of the solid body while leaving another portion of the solid body (e.g., the top layer or top surface 7) uncovered for the illumination light to emerge therefrom after being reflected by the light reflective surface of the reflector.

The overcoating structure serves to shape a specific illumination scheme or pattern of radiation of the side-emitted light, and/or eases the integration of the light source into a system. It may also serve as an exoskeleton of the light source (where the light transmissive part 3 is made of a material that is more rigid than the fiber 6.)

FIG. 1b shows several aspects of an example composite overcoating structure. This is a section view in a transverse plane (transverse to the longitudinal axis 2 of the fiber 6), with FIG. 1c illustrating the side-emitted light emerging from the embedded fiber 6. One aspect that is shown here is that the light transmissive part 3 has a flat or entirely horizontal top layer 7 (or top surface 7), which is not covered by the reflective part 4 and through which the concentrated or redirected side-emitted light emerges, e.g., into air that surrounds the light source. This is facilitated by the "asymmetric shape" of the composite structure about the center longitudinal axis 2, which refers to the fact that it lacks rotational symmetry about the center longitudinal axis 2. However, as best illustrated in FIG. 1c, the overcoating structure may have left-right reflection symmetry across a vertical, longitudinal plane 5 (in which the center longitudinal axis 2 lies.)

In the particular example of FIGS. 1b-1c, the light transmissive part 3 has a "parabolic" shape, and where the reflective part 4 is formed as a layer that covers and conforms to the bottom surface of the light transmissive part 3, while the latter's top surface (or top layer) 7 is not covered, as shown; the light gathering function of the composite lighting structure is however not limited to this shape. Any alternative shape for the reflective part 4 (and its conforming, bottom surface of the light transmissive part 3) that concentrates the light emerging from the side of the fiber 6 (e.g., as in FIG. 1b) in a preferred direction may be possible, such as a U-shape (see FIG. 1a), a half or partial cylindrical shape, a half or partial elliptical shape, a hyperbolical shape, and a multi-segmented shape (composed of straight or curved line segments, similar or different, and that are joined end to end to form a longer curve.) In one embodiment, the entirety of the outer side surface of the light transmissive part 3 (having any one of the above shapes), or its complete side circumference, is divided into two, contiguous sections, namely the top surface or top layer 7, and the rest which is referred to here as the bottom surface. The bottom surface may be curved and covered in its entirety by the reflective part 4, but the top surface is not curved (flat) and is not covered at all by the reflective part 4.

The asymmetrical shape of the composite overcoating serves to concentrate and redirect the side-emitted light (that is emerging from the fiber 6) in a preferred outward transverse direction, which in the case of the examples here is directed outward through the top surface 7 (or top layer 7) of the light transmissive part 3. FIG. 1b shows the interaction of the light that emerges from the side of optical fiber, with the overcoating, in a plane transverse to the longitudinal axis 2 of the fiber 6. The longitudinal axis 2 of the optical fiber 6 in this example is substantially positioned on a vertical symmetry axis (lying in the vertical longitudinal plane 5) of the parabolic shape, in the vicinity of the focus of the parabola (that is defined by the bottom surface). As seen in the perspective view of FIG. 1c, light emerging from the lengthwise segment 9 of the fiber 6 is redirected by the reflective part 4 in a transverse direction, and, especially due to the asymmetric shape of the reflective part 4. In one embodiment, the redirected light emerges from the composite structure from only the top layer or surface 7 of the composite lighting structure (due to the entirety of the bottom surface being covered by the reflective part 4).

Figure 3A:
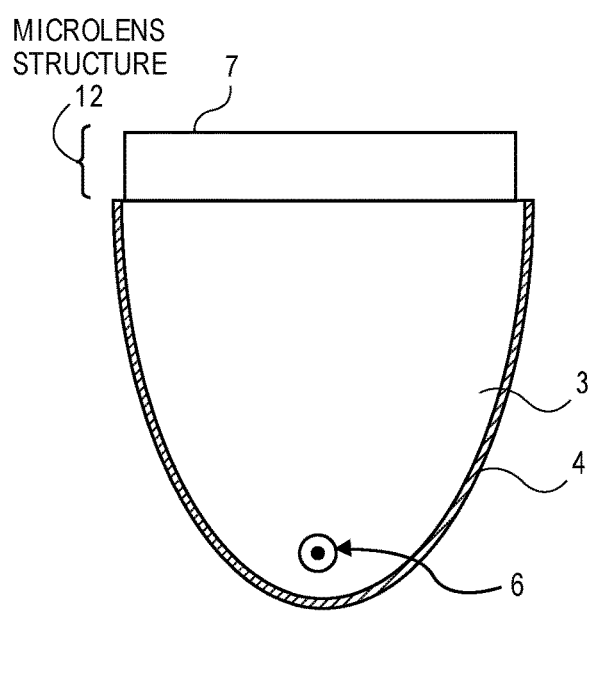
FIG. 3a shows a section view in a transverse plane of a composite overcoating structure having a microlens array structure at its top surface.
Figure 4A:
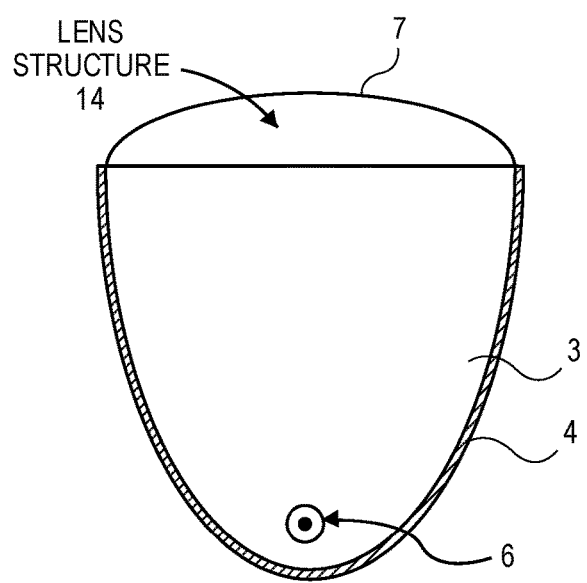
FIG. 4a shows a section view in a transverse plane of a composite overcoating structure having a single lens structure at its top surface.
Figure 4B:
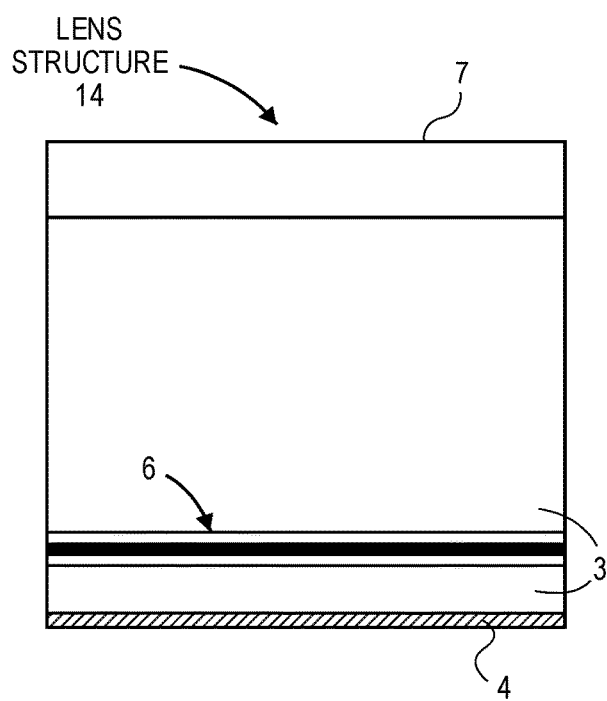

FIG. 2a and FIG. 2b show another composite structure in a section view in a longitudinal plan, but where the top layer 7 is mechanically structured into a "prismatic lens" (or simply, prismatic) structure 10 (although the light redirection and/or recycling function of the mechanical structure is not limited to a prismatic lens—see for example FIG. 3a and FIG. 4b. A goal here is to redirect and recycle the light that is emerging transversely from the fiber 6 and that reaches the top surface of the light transmissive part 3, so as to become more collimated as it emerges outward, and along the length of the fiber 6. The prismatic structure 10 may have any suitable combination of adjacently placed, prism cells or conical cells, each of which may be tilted relative to the vertical, e.g. a one-dimensional array of adjacently placed, tilted prism cells, or other types of prism cells that are arranged to form a prismatic lens that achieves a particular light beam redirection function. In this embodiment of the prsimatic structure 10, each individual prism cell is elongated in the transverse direction as seen in FIG. 2c, and the prism cells are positioned or oriented side by side (not end to end) in the longitudinal direction as seen in FIG. 2a and in FIG. 2b. In other embodiments, the prism cells may not be elongated, e.g., they may be squares. The prismatic structure 10 may be made of a suitable light transmissive material, which may be different than that of the light transmissive part 3 which is joined directly below; it may be made as separate piece (of which the top surface or top layer 7 is a part) that is then joined to a flat top surface of the light transmissive part 3. FIG. 2b shows the interaction between light that emerges from the side of the optical fiber 6 and the composite overcoating, in a plan longitudinal to the fiber 6. Light emerging from the fiber may be directly redirected by refraction at the air-prism interface which is indicated as (1) in the figure, and it may also be indirectly redirected, i.e. undergoing several reflections inside the composite lighting structure before leaving it, indicated as (2) in the figure. FIG. 2c shows the composite structure of FIG. 2a in a section view in a transverse plane.

Figure 3B:
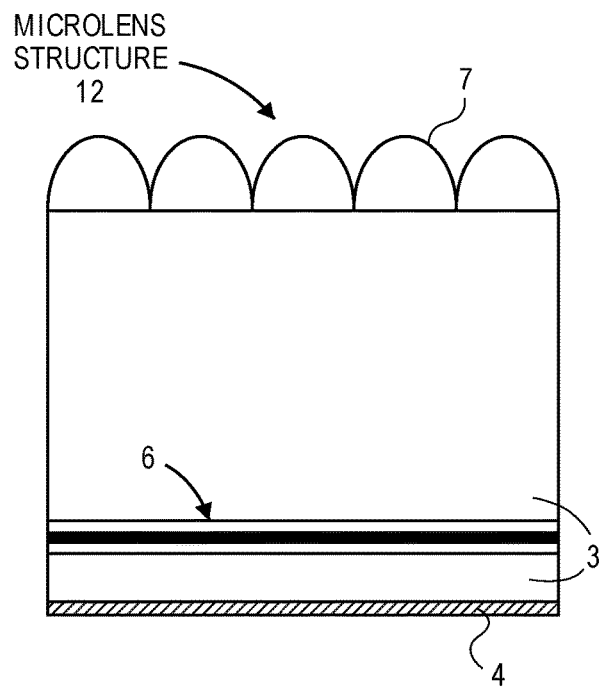

FIG. 3a shows a section view in a transverse plane of a composite overcoating structure having a microlens array structure 12 at its top surface 7. FIG. 3b shows a section view in a vertical longitudinal plane, of the composite overcoating structure of FIG. 3a. In this embodiment, each individual microlens is elongated in the transverse direction as seen in FIG. 3a, and the microlenses are positioned or oriented side by side (not end to end) in the longitudinal direction as seen in FIG. 3b. The individual microlenses of the microlens structure 12 are said to "selectively" focus or homogenize the side-emitted light out of the overcoating structure, in contrast to the single continuous lens structure 14 shown in FIG. 4a and in FIG. 4b that "totally" focuses the side-emitted light out of the overcoating. The microlens array structure 12 and the single continuous lens structure 14 may each be made of a suitable light transmissive material, which may be different than that of the light transmissive part 3 which is joined directly below; each may be made as separate piece (of which the top surface of top layer 7 is a part) that is then joined to a flat top surface of the light transmissive part 3.

Figure 5:
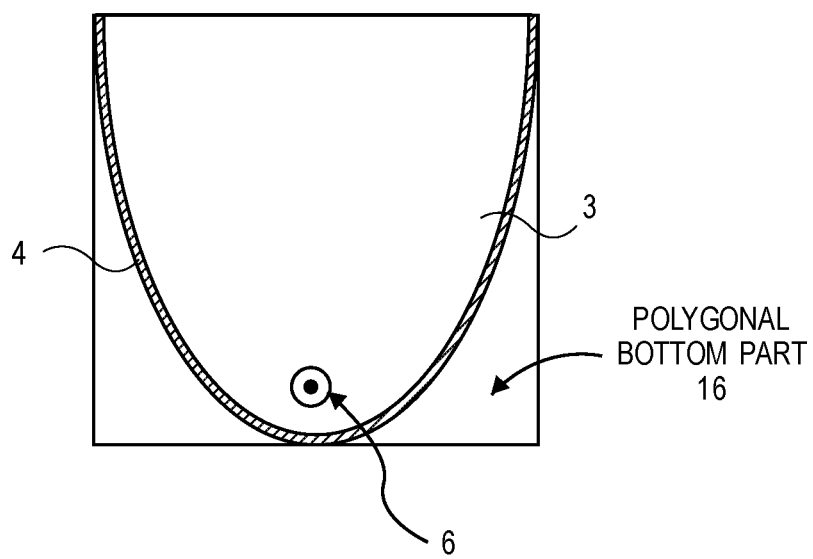
FIG. 5 shows a section view in a transverse plane of a composite overcoating structure that is integrated with a polygonal bottom part.
Figure 6:
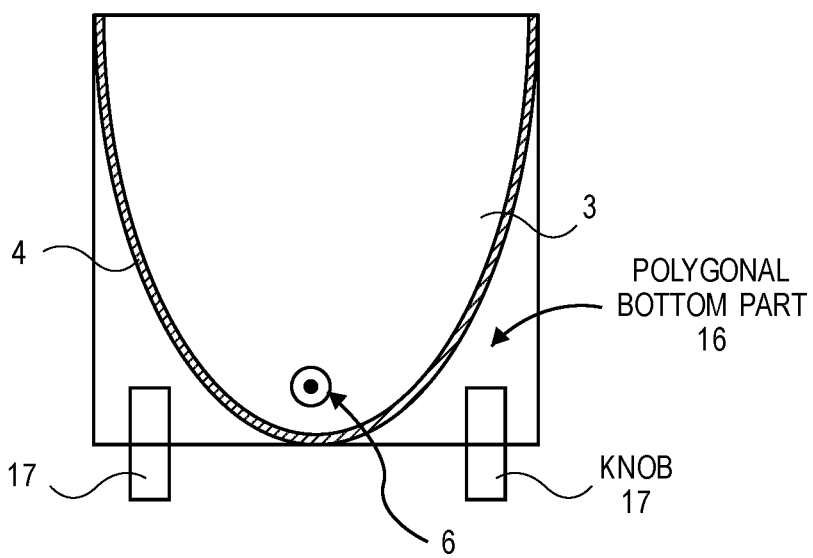
FIG. 6 shows a section view in a transverse plane of a composite overcoating structure that is integrated with a polygonal bottom part that has one or more knobs embedded therein that extend outward of the bottom part.

FIG. 5 and FIG. 6 show further aspects of an embodiment of the composite structure, where different examples of a bottom part of the composite structure are shown that can serve to more easily affix the light source as part of a larger system. FIG. 5 shows a polygon shaped or polygonal bottom part 16, which on one side conforms to the outer face of the reflective part 4 while on the opposite side is polygon shaped (here, having a left corner joined by a straight section to a right corner, although other polygonal shapes are possible.) The polygonal shape enables use of the bottom part 16 as a keyed structure, to fit the light source into a mating, keyed receptacle of the system. FIG. 6 shows the combination of the structure of FIG. 5 and several knobs 17 (two are visible), where the knobs 17 are affixed to the outer face of the polygonal bottom part 16 and extend outward therefrom. The knobs 17 can serve to affix the light source to a system. The knobs can be made of the same material as the polygonal bottom part 16 such that they form a single or integral part of the light source. Alternatively, the knobs 17 can be separately formed pieces that are bonded to or inserted into the polygonal bottom part 16, e.g., prior to a polymerization process that yields the precise boundary of the outside face of the polygonal bottom part 16.

While certain embodiments have been described above and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIGS. 2a-2c show the prismatic lens structure composed of elongated prism cells arranged side by side in a sequence that extends in the longitudinal plane, an alternative may be to orient the prism cells side by side in a sequence extending in the transverse plane. The description is thus to be regarded as illustrative instead of limiting.

What is claimed is:

1. A composite structure having an embedded, side-emitting optical fiber, comprising:
    an optical fiber having a lengthwise segment in which a scattering structure is formed that is to redirect primary propagating light within the fiber, and an active photoluminescent layer integrated in the optical fiber that is to wavelength-convert the primary propagating light into secondary light, wherein the secondary light is emitted out of the fiber through an outer side surface of the lengthwise segment of the fiber; and
    a composite overcoating formed on the outer side surface through which the secondary light is emitted out of the lengthwise segment of the fiber, having (i) an inactive light transmissive portion that does not wavelength-convert and is formed on and entirely surrounds the outer side surface through which the secondary light is emitted out of the lengthwise segment of the fiber, and has an asymmetric shape about a longitudinal center axis of the fiber, and (ii) a light reflective layer that is formed on and conforms to an outer side surface of the inactive light transmissive portion except for a top layer thereof, wherein the secondary light, as emitted from the outer side surface of the lengthwise segment of the fiber and then redirected by the reflective layer, is to emerge from the composite structure through the top layer.

2. The composite structure of claim 1, wherein a cross section of the light reflective layer, taken in a transverse plane, defines a parabola, and the lengthwise segment of the fiber is positioned in the vicinity of the focus of the parabola.

3. The composite structure of claim 1 wherein a cross section of the light reflective layer, taken in a transverse plane, defines part of a circle, ellipse, or hyperbola.

4. The composite structure of claim 1 wherein a cross section of the light reflective layer, taken in a transverse plane, defines a line that includes a plurality of line segments of different curvatures.

5. The composite structure of claim 1 wherein a cross section of the light reflective layer, taken in a transverse plane, defines a line that includes a plurality of straight line segments joined end to end.

6. The composite structure of claim 1 wherein the top layer of the inactive, light transmissive portion comprises a plurality of prisms oriented side by side, not end to end, in the direction of the longitudinal axis of the optical fiber.

7. The composite structure of claim 1 wherein the top layer of the inactive, light transmissive portion comprises a plurality of microlenses in a longitudinal plane or in a transverse plane.

8. The composite structure of claim 1 wherein the top layer of the inactive, light transmissive portion comprises a single convex lens in a longitudinal plane or in a transverse plane.

9. The composite structure of claim 1 wherein the composite overcoating further comprises a bottom portion whose one side conforms to and is in contact with a bottom surface of the light reflective layer and whose opposite side is polygon shaped in a longitudinal plane or in a transverse plane.

10. The composite structure of claim 9 further comprising a plurality of knobs that are affixed to the bottom portion and that protrude therefrom.

11. The composite structure of claim 10 wherein the knobs are made of the same material as the bottom portion of the composite overcoating or are formed as an integral part of the bottom portion.

12. The composite structure of claim 10 wherein the knobs are formed as separate pieces than the bottom portion, and are bonded to the bottom potion.

13. The composite structure of claim 1 further comprising a light emitter that produces the primary propagating light and is coupled to the optical fiber.

14. The composite structure of claim 13 wherein the light emitter comprises a laser or a light emitting diode that produces the primary propagating light.

15. The composite structure of claim 1 wherein the light reflective layer covers a majority of the entire area of the outer side surface of the inactive light transmissive portion, and further comprising a light emitter that produces the primary propagating light and is coupled to the optical fiber.

16. The composite structure of claim 15 wherein the light emitter comprises a laser or a light emitting diode that produces the primary propagating light.

17. A lighting structure comprising:
    a solid body made of an inactive, light transmissive material and being generally cylindrical but without rotational symmetry about an internal longitudinal axis or spine of the body, wherein the body has a side surface that extends from a near face of the body to a far face of the body;
    an optical fiber having a lengthwise segment in which a scattering structure is formed that is to redirect primary propagating light within the fiber, and an active photoluminescent layer integrated in the optical fiber that is to wavelength-convert the primary propagating light into secondary light, wherein the secondary light is emitted out from a side surface of the lengthwise segment of the fiber into the solid body, wherein the lengthwise segment of the fiber is positioned inside the solid body, entirely coinciding with the longitudinal axis of the solid body; and
    an external reflector having a curved, light reflective surface that conforms to and abuts a portion of the side surface of the solid body while leaving another portion of the solid body uncovered for the secondary light to emerge therefrom after being reflected by the light reflective surface of the reflector.

18. The lighting structure of claim 17 wherein a cross section of the external reflector, taken in a transverse plane relative to the longitudinal axis, defines a parabola, and wherein an intersection of the transverse plane and the lengthwise segment of the fiber is at the focus of the parabola.

19. The lighting structure of claim 18 wherein the external reflector covers a majority of the entire area of the side surface of the solid body.

20. The lighting structure of claim 19 wherein said another portion of the solid body that is uncovered by the external reflector is planar.

21. The lighting structure of claim 17 wherein said another portion of the solid body that is uncovered by the external reflector is generally planar with a layer of microlenses.

22. The lighting structure of claim 17 wherein said another portion of the solid body that is uncovered by the external reflector is generally planar with a layer of prisms through which the secondary light is to emerge redirected.

23. The lighting structure of claim 17 wherein the external reflector covers a majority of the entire area of the side surface of the solid body.

24. The lighting structure of claim 17 wherein said another portion of the solid body that is uncovered by the external reflector is planar.

25. The lighting structure of claim 23 further comprising a light emitter that produces the primary propagating light and is coupled to the optical fiber.

26. The lighting structure of claim 25 wherein the light emitter comprises a laser or a light emitting diode that produces the primary propagating light.

27. The lighting structure of claim 17 further comprising a light emitter that produces the primary propagating light and is coupled to the optical fiber.

28. The lighting structure of claim 27 wherein the light emitter comprises a laser or a light emitting diode that produces the primary propagating light.

* * * * *